Sept. 25, 1951 E. L. CLARK 2,569,289

AUTOMATIC GAIN CONTROL SYSTEM

Filed Aug. 31, 1945 2 Sheets-Sheet 1

INVENTOR

Edwin L. Clark

BY H. S. Grover

ATTORNEY

Sept. 25, 1951 E. L. CLARK 2,569,289

AUTOMATIC GAIN CONTROL SYSTEM

Filed Aug. 31, 1945 2 Sheets-Sheet 2

INVENTOR
Edwin L. Clark
BY H. S. Grover.
ATTORNEY

Patented Sept. 25, 1951 2,569,289

UNITED STATES PATENT OFFICE 2,569,289

AUTOMATIC GAIN CONTROL SYSTEM

Edwin L. Clark, Collingswood, N. J., assignor to Radio Corporation of America, a corporation of Delaware Application August 31, 1945, Serial No. 613,772

1 Claim. (Cl. 250—20)

The present invention relates generally to automatic gain control systems or A. V. C. systems, and more particularly, but not necessarily exclusively, to improvements in such systems to make them especially useful in television receivers or the like.

In accordance with the invention, an A. V. C. voltage is provided which is independent of scene or the transmitted image and which is not affected by noise. This A. V. C. voltage is derived in a novel manner from the carrier or its equivalent, which, for purposes of this invention, is the intermediate frequency signal and/or from modulations on the carrier. The improved arrangement to be disclosed for deriving the A. V. C. voltage includes a novel contrast control which is effective upon the incoming image-bearing carrier signal before it is demodulated for use in controlling the image producing device of the apparatus in which it is employed. It will be understood that the apparatus just referred to may be equipment for producing a television image or general indicating equipment such as radar devices.

Accordingly, it is a primary object of the present invention to provide a system for deriving an A. V. C. voltage which is independent of scene and which may be derived in such a manner as to be unaffected by undesired received signal components ordinarily referred to as "noise."

Another object is to provide an improved A. V. C. system employing a direct current amplifier for the developed A. V. C. voltage.

A further object is to provide a novel A. V. C. system having incorporated therein a contrast control for effecting changes in contrast in the produced image.

A still further object is to provide a combination of cooperating electrical circuits, each circuit having a time constant which is related in a special way with another circuit in the combination.

A still further object is to provide a novel combination of circuits, the time constants of which are related in such a manner to a characteristic of the received signal that noise components are ineffective to vary the derived A. V. C. voltage.

Figure 1:
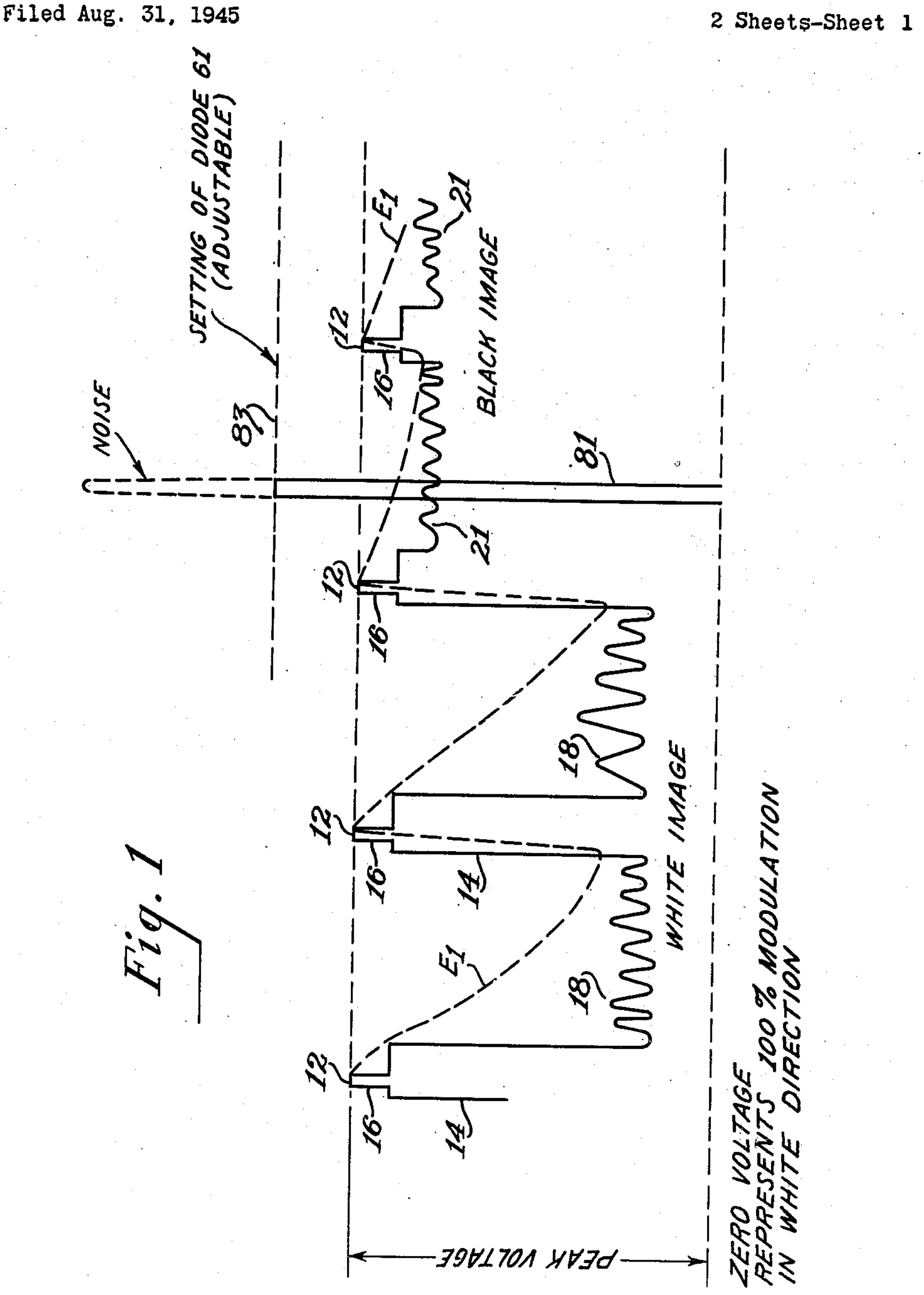
Figure 2:
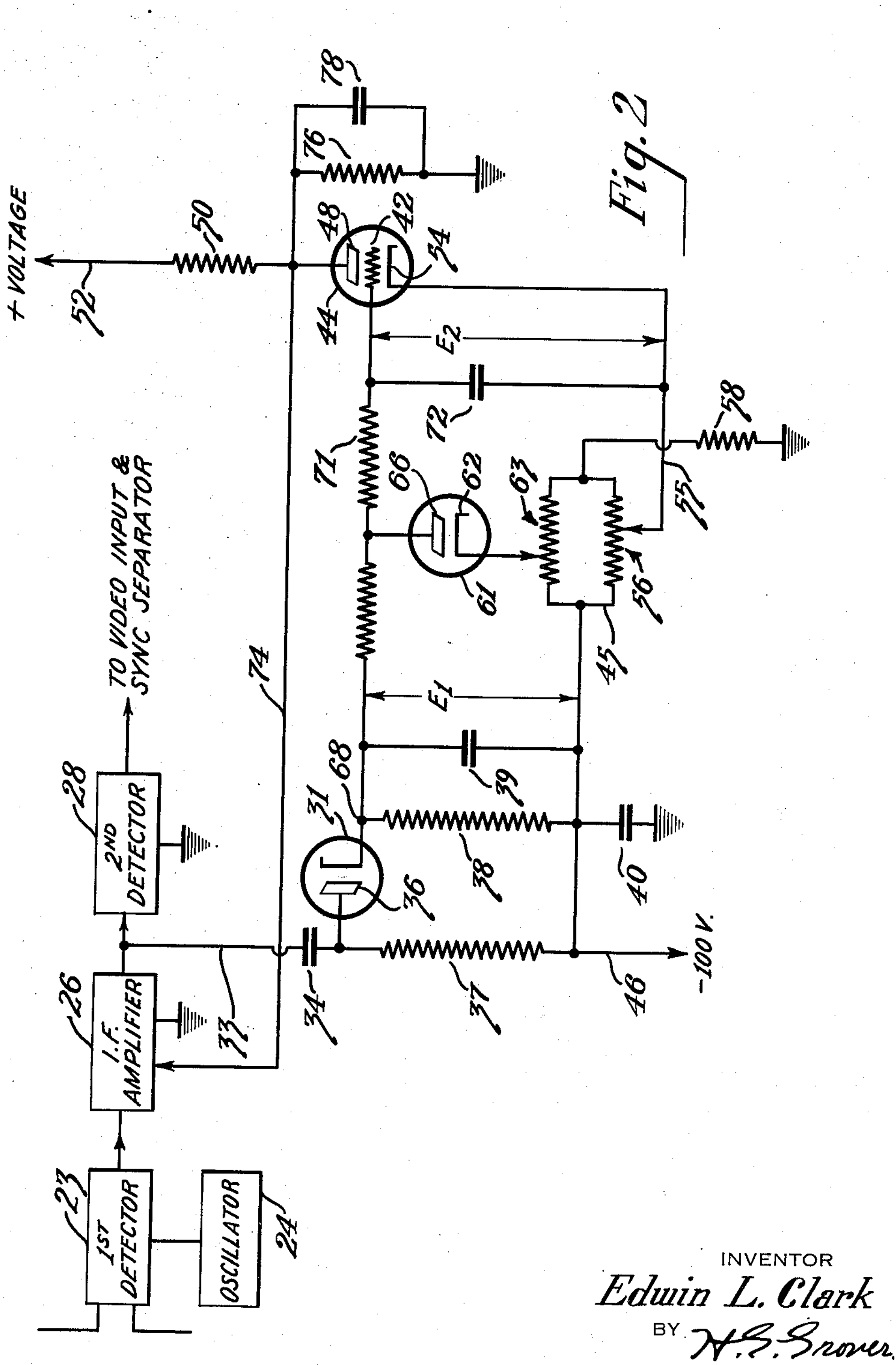

Other objects and advantages of the present invention will, of course, become apparent and immediately suggest themselves to those skilled in the art to which the invention is directed from a reading of the following specification in connection with the accompanying drawing in which:

Fig. 1 is a representation of an assumed signal wave form referred to by way of example in describing the invention; and Fig. 2 is a schematic disclosure of an A. V. C. system in accordance with the invention.

Fig. 1 shows the general characteristics of a transmitted signal such as is derived when scanning an image to produce image signals and combining control signals with the image signals. The signal depicted by Fig. 1 will be recognized as the familiar television or video signal which is transmitted to more or less remote receivers by amplitude modulating a radio frequency carrier. The A. V. C. system of this invention is intended to function effectively while receiving a signal of the general characteristics of Fig. 1 in which there is a recurring peak amplitude indicated at the points 12. It will be understood that the invention may be employed effectively in electrical apparatus designed to receive signals including modulating components of the general nature of Fig. 1, characterized by recurring peaks originally of constant amplitude but subject to attenuation in transmission. Such attenuation is offset effectively by apparatus in accordance with the present invention without regard to random components of greater amplitude than the amplitude of the received signals even in the absence of modulation.

More in detail, the signal of Fig. 1 includes blanking signals 14 and horizontal sync pulses 16. The zero axis of Fig. 1 represents 100 per cent modulation of a carrier in the so-called "white" direction to represent lighter or white portions of the image, and peaks of the blanking signals 14 correspond to the signal level when scanning black portions of the image. The image signal representations 18 and 21, respectively, are indicative of image signals generated upon scanning of light and dark portions, respectively, of an image of a scene or the like. The description immediately foregoing applies to the so-called negative modulation process. In other words, the synchronizing, or more commonly termed "sync," impulses (which are in the black direction and which are the so-called "blacker-than-black" or "ultra" black pulses) produce maximum amplitude of the carrier wave. The system of this invention is equally effective for positive modulation signals. A comparison of the portions 18 and 21 of the curve of Fig. 1 shows that a change from a dark portion of the image to a light portion of the image does not cause a change in the amplitude or the level of the sync pulses. It follows that any variation in the height of the sync pulse carrier components will be a result of fading or attenuation of the transmitted modulated carrier signal. The A. V. C. voltage derived by apparatus embodying features of the present invention has a value which is independent of the scene or background of the image being transmitted when the carrier is modulated. The waveforms, signal levels, and pulse forms are shown only in an illustrative sense and as an aid to describing the operation of the invention and are not intended to represent exact values or even the exact sequence of events in the operation of apparatus embodying the invention.

Referring now to Fig. 2, there is illustrated a portion of a television receiver of the superheterodyne type comprising the usual first detector 23, a tunable oscillator 24, an intermediate frequency amplifier 26, to be referred to as the I. F. amplifier, and a second detector 28. The output of the second detector 28 is furnished to a video amplifier and a sync separator (neither shown) or to other equipment to be energized by the received and demodulated signals.

A diode 31 is coupled to one of the stages of the I. F. amplifier 26, for example the last stage, in such a way that the rectified signal provided by this diode is of positive polarity. This is accomplished by furnishing the signal over a connection 33 and a condenser 34 to the anode 36 of the diode. The intermediate frequency signal to be detected is developed across a resistor 37. A by-pass condenser 40 effectively grounds one end of the resistor 37. The diode circuit includes a load resistor 38 shunted by a condenser 39 which, considered as a series combination of a resistor and a condenser, has a time constant which is approximately equal to the time of one horizontal line of the scanned television image, or the time between the sync signals 12, so that the diode 31 serves as a peak detector at intermediate frequency. The detected signal is of positive polarity as applied to the control grid 42 of an amplifier tube 44.

The plate 48 of the tube 44 is connected by way of a load resistor 50 to a common return point such as ground, or to a source of relatively low positive potential by way of a connection 52, depending upon the type of tube selected. The voltage effective at the connection 52 will be selected so that the tube 44 operates as an amplifier on a substantially linear portion of its characteristic curve. The cathode 54 of the tube 44 is connected to the adjustable contact of a potentiometer 56, the latter being connected in series with a resistor 58 to serve as a voltage divider. The potentiometer 56 and the resistor 58 are connected by way of the previously mentioned connection 46 to the source of negative biasing potential, the connection being completed by grounding the resistor.

The plate voltage for the amplifier tube 44 is applied between its cathode 54 and ground, its plate 48 being at or nearly at ground potential. The operating grid bias for the tube is obtained by varying the position of the return connection 55 for the cathode 54 on the bleeder 56 and 58. This is done by varying the contact point of the potentiometer 56. Thus, the IR drop across the portion of potentiometer 56 between its contact point and end 45 is applied as a bias between the grid 42 and the cathode 54 of the tube 44.

A second diode 61 is connected across the developed positive bias which is applied to the grid 42 of the tube 44. Its cathode 62 is connected to the movable contact of a potentiometer 63 so that the potential difference between the plate 66 and the cathode 62 of the diode 61 may be adjusted. Depending on the adjustment, when substantially noise-free signals are being received, the diode 61 does not conduct, and the grid 42 of the D. C. amplifier will receive all of the voltage developed as a result of the operation of the diode 31 as a peak detector. It will be noted that the grid 42 is D. C. coupled to the end 68 of the cathode load resistor and that a direct physical connection exists to the source of negative biasing potential in communication with the connection 46. The circuit of the grid 42 contains a relatively long time constant resistance and capacity combination 71 and 72. By way of example, the time constant of the R.-C. combination may be one thousand times that of the R.-C. combination 38—39.

The output of the amplifier 44 is connected forwardly to a suitable control point in the apparatus such as the I. F. amplifier 26 over a connection 74. The plate of the amplifier 48, it will be understood, is negative with respect to ground so that a negative bias is obtained for the amplifier 26. A negative bias in the absence of signals, or a delay bias, is provided in a novel manner by the connection including the potentiometer 56. This potentiometer serves, in accordance with the invention, as a contrast control by changing the amount of A. V. C. bias developed and it thus varies the video signal produced at the second detector. If desirable or necessary, an I. F. bypass filter-condenser 78 may be connected in the output circuit of the tube 44. In the arrangement shown by way of example, the resistor 76 is part of a plate voltage divider and may be omitted where the source 52 is of suitable voltage.

In operation of the system described herein, signals corresponding to Fig. 1 modulated on a carrier are received. This modulated carrier is changed in frequency in the usual manner in the first detector, and is transmitted through the I. F. amplifier 26. This I. F. signal which is, in effect, a carrier signal modulated by a signal similar to that of Fig. 1, is applied in a positive direction to the plate 36 of the rectifier 31. It will be seen from the foregoing description that this rectifier 31 serves as a peak detector at intermediate frequency. The voltage produced is indicated by the dotted curve $E_1$ on Fig. 1 on the drawings.

The grid 42 of the amplifier 44 is biased, for example, negatively and the peak signal, after transmission by the R.-C. combination 71 and 72, changes this bias. An increase in amplitude of the received carrier signal increases the flow of plate current in the resistor 50, and a more negative bias, therefore, is applied to the I. F. amplifier 26 by way of the conductor 74.

The diode 61, which is connected across the positive bias developed by operation of the diode 31 is biased in such a way that for normal signals the grid 42 of the amplifier tube 44 will receive all of the developed bias voltage. However, if large noise pulses, such as the one indicated by reference character 81 on Fig. 1, are present, the diode 61 will become conductive and limit their amplitude, thus preventing the condenser 72 from charging up on noise and increasing the A. V. C. produced.

The clipping level provided by the setting of the diode 61 and indicated on Fig. 1 by the dotted line 83 is adjusted to allow the maximum usable contrast to be obtained with a given image producing tube or "Kinescope" when the potentiometer 56 is used as a contrast control. The clipping level 83 may be high since the time constant of the first R.-C. combination 38-39 is short and the noise voltage dissipates rapidly. Noise such as the noise pulse 81 is clipped and does not extend beyond the line 83 as shown by its dotted upper portion.

The potentiometer 56, as stated above, is used as a contrast control in accordance with the invention. This varies the delay bias on the amplifier tube 44 thus changing the amount of A. V. C. bias developed and thus varying the video signal produced at the second detector 28.

It is to be noted that while the condenser 39 charges up approximately to peaks 12 of sync that with a time constant equal to the time between successive peaks, the condenser will tend to lose its charge as indicated by the curve $E_1$ (Fig. 1). Therefore, the time constant of the diode circuit in conjunction with the long time constant of the R.-C. combination 71 and 72 in the grid circuit of the tube 44 produces an average positive bias from the I. F. signal modulation. But in addition to the positive bias from the modulation, the direct current produced by the carrier is also positive and is applied to the grid 42. As stated above, the diode time constant is long enough at intermediate frequency to make it a peak detector. The resultant is equivalent to a peak detector regardless of the scene or percentage of modulation. It will be noted that when the diode 61 conducts on noise that a differential voltage will be developed across the resistor 38 thus enhancing operation of the device.

Solely by way of example, it may be assumed that the connection 46 is at a point which is at 100 volts negative with respect to a reference point in the circuit, such as ground, and that the potentiometers 56 and 63 have a resistance of 2,000 ohms each. Also, that the resistor 58 has a value of 33,000 ohms. If, for example, a type 6AQ6 tube is employed for the tube 44, the connection 52 may be in communication with a source of positive potential of 30 volts above ground. The resistor 38 of the first R.-C. combination may have a value of 22,000 ohms, and the condenser 39 a value of .004 mfd. The resistor 71 of the second R.-C. combination may have a value of 470,000 ohms and the condenser 72 a value of .1 mfd. The load resistors 50 and 76 in the plate circuit of the tube 44 may have values of 470,000 and 220,000 ohms. These values are given by way of example only as having been found satisfactory in an A. V. C. system constructed and operated in accordance with the invention.

Having now described the invention, what is claimed and desired to be secured by Letters Patent is the following:

An automatic gain control system for a radio receiver having a carrier signal amplifier, said system comprising a unilaterally conducting device, means to furnish signals from said carrier signal amplifier to said unilaterally conducting device, a resistor and condenser combination connected across said unilaterally conducting device whereby to provide a peak detector at the frequency of the carrier signal amplified by said amplifier, a second unilaterally conducting device having a cathode and an anode effectively connected across said resistor and condenser combination, an electron tube having at least a cathode, an anode and a control electrode, a voltage source having positive and negative terminals, a first and second voltage divider connected in parallel across said voltage source terminals, each divider having adjustable taps, a direct current conducting connection from one of said taps to the cathode of said second unilaterally conducting device, a direct current conducting connection from said other tap to the cathode of said electron tube, a direct current conducting connection from said negative supply terminal through said resistor of said resistor and condenser combination to the grid of said tube and to the anode of said second unilaterally conductive device, the adjustment of said tap connected to the cathode of said second unilaterally conductive device providing a bias on said unilaterally conductive device of a magnitude to bias the unilaterally conductive device to non-conduction in the absence of noise exceeding an amplitude substantially in excess of the average signal level, a second resistor and condenser combination having a relatively long time constant whereby to integrate the voltage produced at said first named resistor and condenser combination, said last named resistor being included between the control electrode of said tube and the anode of said second unilaterally conductive device, said last named condenser being connected between the control electrode and cathode of said tube, and an output connection from the anode of said tube to said modulated wave amplifier whereby to control the gain of said amplifier independently of noise.

EDWIN L. CLARK.

REFERENCES CITED

The following references are of record in the file of this patent:

UNITED STATES PATENTS

| Number | Name | Date |
|---|---|---|
| 2,171,636 | Seeley | Sept. 6, 1939 |
| 2,179,111 | Young | Nov. 7, 1939 |
| 2,199,169 | Dome | Apr. 30, 1940 |
| 2,240,593 | Wilson | May 6, 1941 |
| 2,240,600 | Applegarth | May 6, 1941 |
| 2,246,947 | Martinelli | June 24, 1941 |
| 2,299,292 | Allen | Oct. 20, 1942 |
| 2,302,425 | Deerhake | Nov. 17, 1942 |

FOREIGN PATENTS

| Number | Country | Date |
|---|---|---|
| 110,075 | Australia | Aug. 1, 1940 |

OTHER REFERENCES

Rider, J. G.: Vacuum Tube Voltmeters, 1941, page 18.